SIGNAL RECEIVING SYSTEM HAVING RECIRCULATING DELAY LINES

Filed March 9, 1966 3 Sheets-Sheet 1

INVENTOR
A. E. JOEL, JR.
BY Jason Falk
ATTORNEY

SIGNAL RECEIVING SYSTEM HAVING RECIRCULATING DELAY LINES

April 21, 1970 A. E. JOEL, JR 3,508,200

SIGNAL RECEIVING SYSTEM HAVING RECIRCULATING DELAY LINES

Filed March 9, 1966 3 Sheets-Sheet 3

United States Patent Office 3,508,200
Patented Apr. 21, 1970

3,508,200
SIGNAL RECEIVING SYSTEM HAVING RECIRCULATING DELAY LINES

Amos E. Joel, Jr., South Orange, N.J., assignor to Bell Telephone Laboratories, Incorporated, New York, N.Y., a corporation of New York Filed Mar. 9, 1966, Ser. No. 533,094
Int. Cl. H04q *11/04*
U.S. Cl. 340—147 21 Claims

ABSTRACT OF THE DISCLOSURE

An arrangement wherein a single multifrequency receiver is asynchronously time-shared by a plurality of randomly active multifrequency sources on a signal present basis. Overlapping sequential signals received at random from various sources are gated into the receiver on a race basis. If a signal does not persist long enough after transmission, decoding and registration of a preceding signal to permit receiver response thereto, a recirculating delay line memory retains sufficient of the later signal to permit a proper receiver response.

Figure 1:
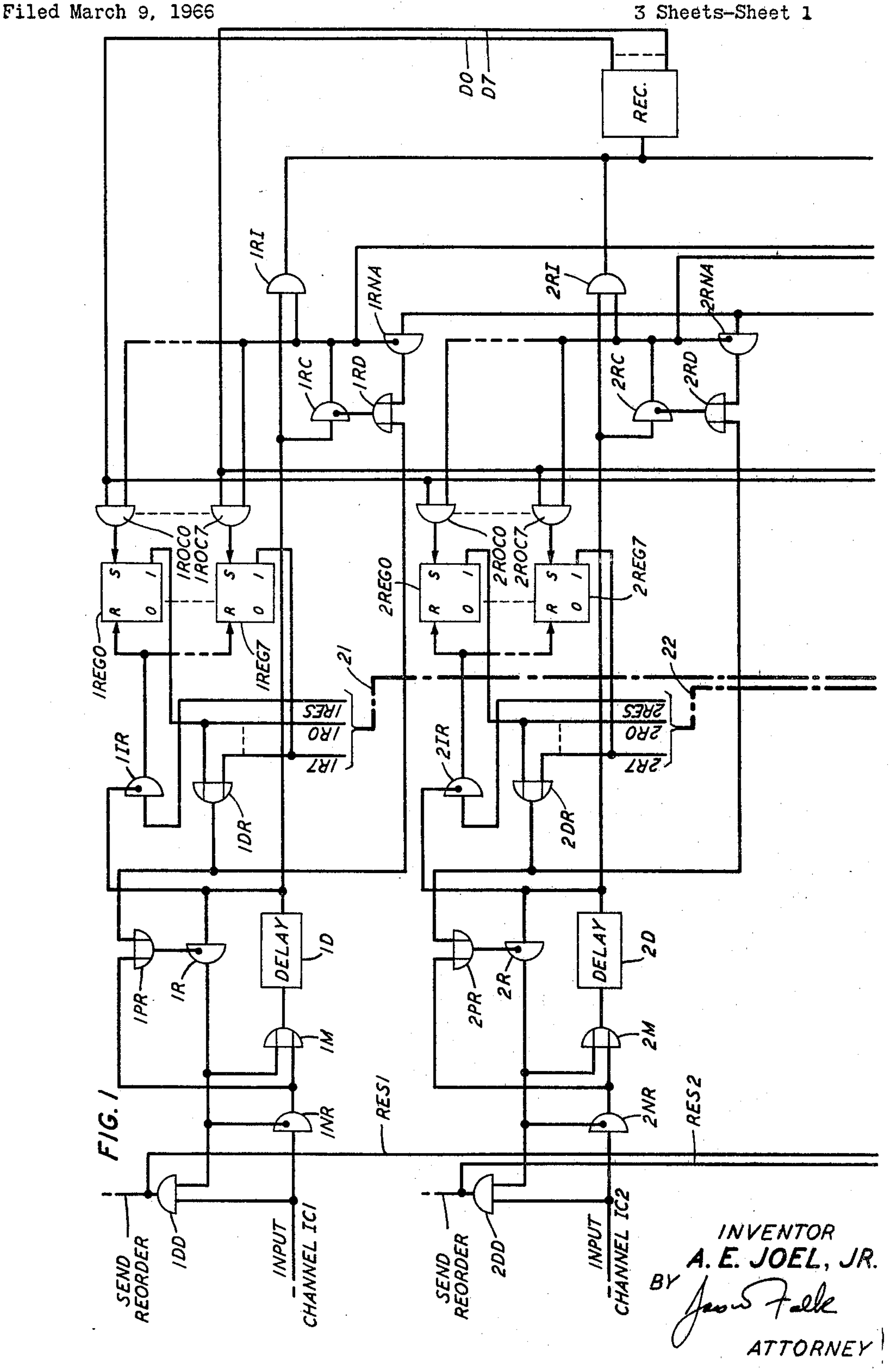

My invention relates generally to signaling systems and more particularly to arrangements for receiving frequency coded signals from a plurality of signal sources.

The use of frequency coded signals as a means for transmitting data is well known in the field of data communications. One specific example thereof is the use of multifrequency signals between telephone central offices for the transmission of call routing and supervisory data. A further example is the use of multifrequency signals between a telephone station and a telephone central office for the transmission of call routing data.

In both of the above examples and in other applications of frequency coded data transmission the efficiency of the signal receiver which decodes the signals is determined by the rate at which sequential input signals are applied to the signal receiver. Since one signal receiver usually is provided for each input channel over which the signals are received, the rate of signal reception by a receiver depends upon the rate at which signals are transmitted over the associated input channel. This signal transmitting rate often is considerably less than is the rate at which the signal receiver is capable of processing successive input signals. Thus, each signal receiver is not operating at peak efficiency within the limits of its signal processing capability. This is particularly true in those situations where frequency coded signals are manually keyed, as in the case of a telephone user or a telephone operator.

It is a general object of my invention to increase the operating efficiency of systems for receiving frequency coded signals at random from a plurality of input channels.

This and other objects of my invention are achieved in one illustrative embodiment thereof wherein a signal receiver is asynchronously time shared by a plurality of input channels. In accordance with this embodiment of my invention, access circuits are provided between each of a plurality of input channels and one signal receiver. The access circuits are arranged to connect only one of the input channels to the signal receiver at any given time. An input channel is connected to the receiver only when an input signal is present on that input channel. The input channel then remains connected to the receiver only for the specific time duration required for the receiver to decode the signal. Data defining the decoded signal is temporarily registered on a set of channel buffer flip-flops discretely associated with the input channel over which the decoded signal was received. The receiver is then made accessible to any of the input channels other than the input channel over which the last processed signal was received. The information registered on the channel flip-flops is transmitted to a channel register, also discretely associated with the input channel, and the channel flip-flops are then RESET to their initial state in preparation for registering new data representing the next input signal received over the input channel. The signal receiver is then made accessible to the input channel over which the processed input signal was received as well as to the other input channels. Advantageously, this arrangement substantially reduces the number of signal receivers required to service a given number of input channels and permits a signal receiver to operate to its full capacity. Accordingly, the operational efficiency of the signal receiving system is substantially increased.

In accordance with a feature of my invention, the access circuits between each input channel and the signal receiver connect each input channel to the signal receiver in response to sequential overlapping signals on a race basis; that is, a first received signal will inhibit access to the receiver for subsequent input signals over any of the input channels until the first received input signal is processed by the signal receiver.

In accordance with another feature of my invention, if an input signal on one input channel does not persist long enough after the processing of a preceding input signal on another input channel by the signal receiver to permit proper receiver response to the later signal, a recirculating delay line memory retains a sufficient sample of the later input signal to permit proper receiver response thereto.

In accordance with a further feature of my invention, the delay time period of the recirculating delay line is at least equivalent to the signal duration time required for response thereto by the signal receiver.

Advantageously, the above described arrangement has the ability to cope with any combination of sequentially received input signal of various of time durations over the same or different input channels. If sufficient time elapses between successive input signals on the same or different input channels, the input channels on which the input signals successively appear are immediately connected to the receiver in response to the successive signals. The signals are successively decoded by the receiver and corresponding data is registered in the appropriate channel registers If an input signal persists after its processing is completed by the signal receiver, the input channel on which the input signal appears is denied access to the signal receiver until the input signal ends.

If the later of two or more overlapping inputs signals on different channels persists after the earlier input signal is decoded and registered on the proper channel buffer flip-flops, the input channel carrying the later input signal is immediately connected to the signal receiver for processing. If the later of two input signals does not persist sufficiently long to allow proper receiver response thereto, the later signal is treated as if it had ended before processing of the earlier signal was completed by the signal receiver. If the later signal ends before processing of an earlier input signal is completed by the receiver, a timed sample of the end portion of the later signal which is sufficient to elicit proper receiver response is recirculated through the delay line until processing of the earlier input signal is completed by the receiver and the input channel carrying the later signal is given access to the receiver.

If a later signal appears on an input channel while an earlier input signal on that same channel is still being recirculated, an alarm signal is generated which causes the channel register associated with that input channel to be returned to its initial state and causes the pulse source connected to that input channel to be notified that the entire sequence of input signals must be regenerated.

Figures 2, 3:
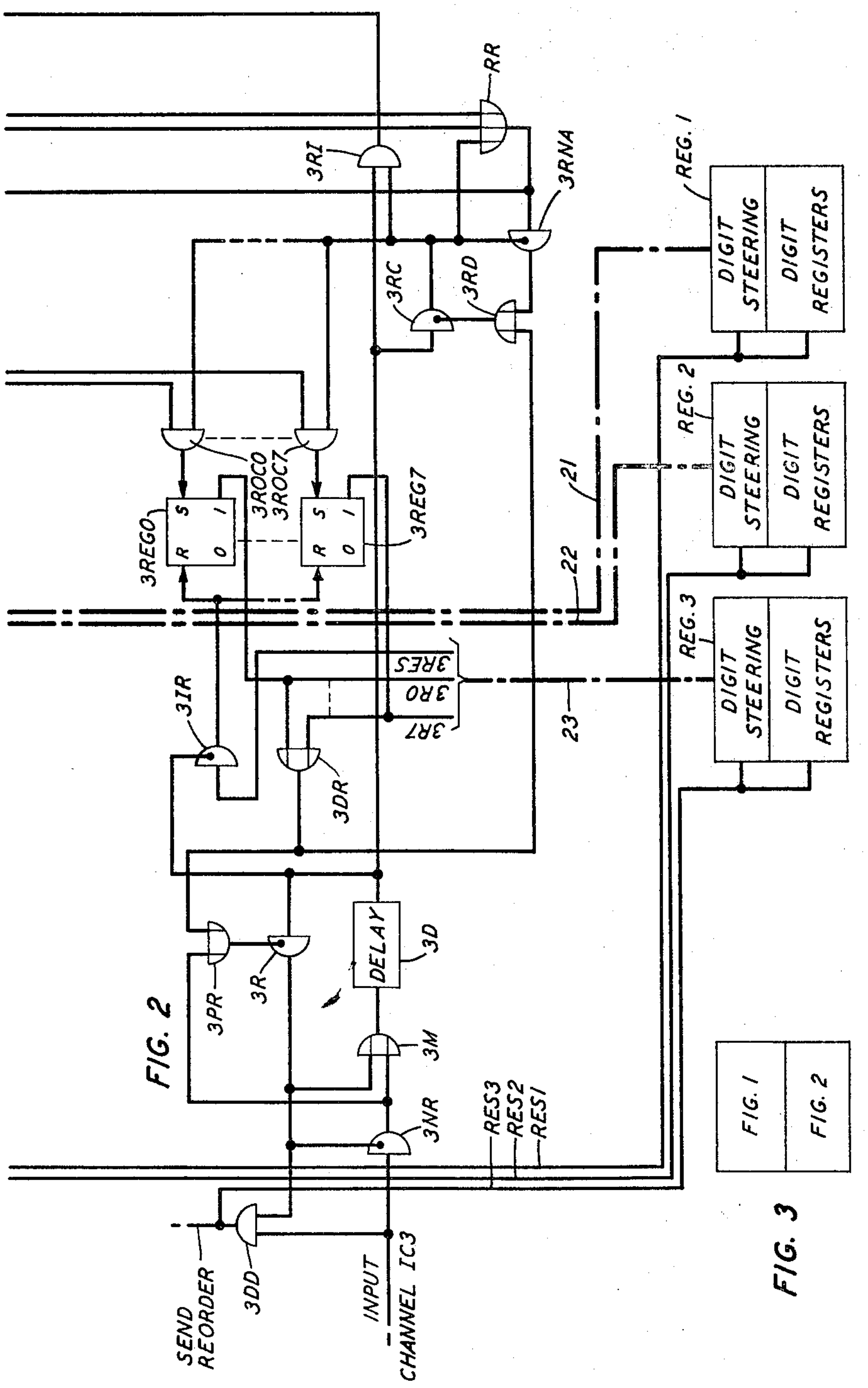
Figures 4A, 4B, 4C, 4D, 4E, 4F, 4G:
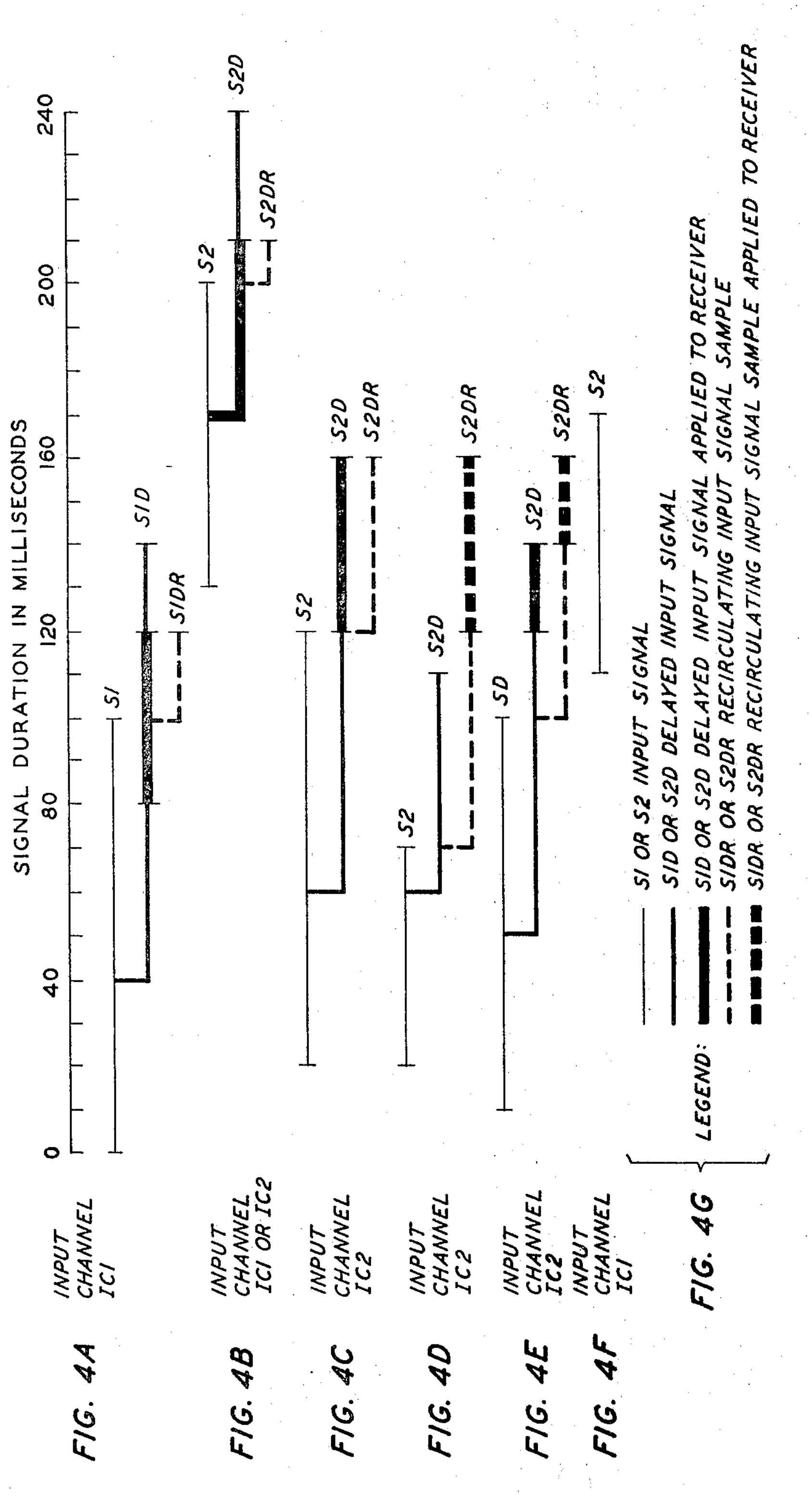

The above and other objects and features of my invention will be more readily understood from the following description when read with reference to the drawing in which:

FIGS. 1 and 2, when arranged in accordance with FIG. 3, schematically illustrate access circuitry between a plurality of input channels and a single signal receiver whereby the receiver is asynchronously timed shared by the input channels;

FIGS. 4A through 4F are a timing chart illustrating various combinations of input signal duration and time of reception to which the arrangement of FIGS. 1 and 2 responds; and FIG. 4G is a legend of the symbology employed in FIGS. 4A–4F.

The logic circuits schematically illustrated in FIGS. 1 and 2 may be of any well known logic type having suitable transmission and pulse response characteristics. Since such circuits are well known in the communications art, no further description thereof is included herein.

FIGS. 1 and 2 illustrate an arrangement for sequentially servicing frequency coded signals received over a plurality of input channels IC1, IC2 and IC3 by a single signal receiver REC. For purposes of this description, it is assumed that a signal must be applied to receiver REC for at least 40 milliseconds to produce a proper response to the applied signal by receiver REC. This minimum signal time duration will, of course, vary in accordance with the requirements of the particular signal receiver employed. Signal receiver REC can be any of the well known circuits which decode frequency coded input signals and provide corresponding DC output signals. Signal receivers of this type are well known in the communications art and will not be described further herein.

Associated with each input channel IC1, IC2 and IC3 is a set of channel flip-flops 1REG0–1REG7, 2REG0–2REG7 and 3REG0–3REG7 which serve as buffer storage between the common signal receiver REC and the channel registers REG1, REG2 and REG3 which also are associated respectively with each input channel IC1, IC2 and IC3. Output signals from receiver REC which represent successively received input signals over the same input channel, e.g., IC1, are first buffered by the appropriate channel flip-flops, e.g., 1REG0–1REG7, and then registered in successive digit registers within the appropriate channel register, e.g., REG1. A steering circuit within channel register REG1 advances access from the associated channel flip-flop set 1REG0–1REG7 to successive digit registers in channel register REG1 each time information is registered in a digit register of channel register REG1. Steering circuits in channel registers REG2 and REG3 perform a similar function for their respective digit registers.

So long as input signals on the various input channels IC1, IC2 and IC3 are separated by sufficient time intervals and do not overlap, the receiver REC can respond to each sequential input signal in turn without difficulty. However, when signals are present simultaneously on mone than one of the input channels IC1, IC2 and IC3, the receiver REC cannot respond to more than one input signal at a time. As mentioned earlier herein, the access circuits of my invention can cope with any combination of input signals over the same or different input channels.

FIGS. 4A–4F of the drawing illustrate several combinations of two input signals S1 and S2 which present different timing conditions to the access circuits of my invention. A description is presented below of a number of illustrative input signal timing conditions and the response thereto by the illustrative circuits presented in FIGS. 1 and 2.

SUCCESSIVE SIGNALS ON SAME INPUT CHANNEL (FIGS. 4A AND 4B)

FIG. 4A represents an input signal S1 which appears on channel IC1 and remains thereon for 100 milliseconds.

FIG. 4B illustrates a later input signal S2 appearing on input channel IC1 30 milliseconds after the end of the earlier input signal S1. Thus, FIGS. 4A and 4B in combination represent two successive input signals S1 and S2 appearing on the same input channel IC1 with a time interval of 30 milliseconds therebetween. This combination of input signals S1 and S2 represents the condition wherein successive signals separated by a time interval appear on the same input channel IC1 and are successively processed by receiver REC. A description of the response by the access circuits of FIG. 1 to this combination of input signals S1 and S2 is now presented.

When signal S1 first appears on channel IC1, inhibit gate 1NR is open and signal S1 is transmitted through inhibit gate 1NR and OR gate 1M to delay circuit 1D. Signal S1 also is transmitted through inhibit gate 1NR and OR gate 1PR to the control terminal of inhibit gate 1R. Signal S1 is directly applied to one input terminal of AND gate 1DD.

Delay circuit 1D can be of any well known type, such as a high fidelity audio delay line or a reverberation line. In this one illustrative embodiment of my invention, delay circuit 1D delays signal S1 for a period of 40 milliseconds which corresponds with the response time characteristics of the particular type of signal receiver REC employed in this illustrative embodiment. The signal delay period provided by delay circuit 1D accordingly is at least equivalent to the time of input signal application required for proper response by the receiver REC.

Input signal S1 is delayed for a period of 40 milliseconds by delay circuit 1D and appears at the output thereof as delayed input signal S1D as shown in FIG. 4A 40 milliseconds after input signal S1 first appeared on channel IC1. Delayed input signal S1D is applied to the input terminal of inhibit gate 1R. Inhibit gate 1R remains inhibited so long as the input signal S1 persists. Accordingly, delayed input signal S1D cannot be transmitted through inhibit gate 1R and be applied through OR gate 1M to delay circuit 1D until input signal S1 ceases to appear on channel IC1.

Delayed input signal S1D is applied directly to the control terminal of inhibit gate 1IR causing it to close for reasons discussed later herein.

It is assumed that receiver REC becomes available to channel IC1 80 milliseconds after the initial appearance of input signal S1 on channel IC1. Delayed input signal S1D is continuously applied to the input terminal of inhibit gate 1RC and to one input terminal of AND gate 1RI. Inhibit gate 1RC is opened when receiver REC becomes available to channel IC1 as described later herein. Therefore, an output signal is provided by inhibit gate 1RC in response to the delayed input signal S1D.

The output signal from inhibit gate 1RC is applied to the other input terminal of AND gate 1RI thereby gating delayed input signal S1D through AND gate 1RI to the input of receiver REC. This application of delayed input signal S1D to receiver REC is represented in FIG. 4A by the heavy weight solid line commencing 80 milliseconds after the initial appearance of input signal S1.

The output signal from inhibit gate 1RC also is applied to one input terminal of each of the respective AND gates 1ROC0–1ROC7 and to the control terminal of inhibit gate 1RNA. The output signal from inhibit gate 1RC further is applied through OR gate RR, inhibit gate 3RNA and OR gate 3RD to the control terminal of inhibit gate 3RC and through OR gate RR, inhibit gate 2RNA and OR gate 2RD to the control terminal of inhibit gate 2RC. Since inhibit gate 1RNA is now closed by the output signal from inhibit gate 1RC, no signal can be applied through inhibit gate 1RNA and OR gate 1RD to the control terminal of inhibit gate 1RC.

Since inhibit gates 2RC and 3RC are closed during the time period that channel IC1 is connected through AND gate 1RI to receiver REC, the AND gates 2RI and 3RI which serve to connect channels IC2 and IC3 with receiver REC cannot be enabled and access to receiver REC is denied to channels IC2 and IC3. This condition remains until inhibit gate 1RC ceases to provide an output signal.

As described above, channel IC1 is connected to receiver REC through AND gate 1RI in response to the input signal S1 and the delayed input signal S1D is applied to receiver REC through AND gate 1RI. Receiver REC decodes the delayed input signal S1D and places DC output signals on the appropriate ones of its output conductors D0–D7 so as to define the data represented by input signal S1. These DC output signals from receiver REC are applied to the other input terminals of the respective AND gates 1ROC0–1ROC7. Accordingly, the output signals from receiver REC are gated through AND gates 1ROC0–1ROC7 by the output signal from inhibit gate 1RC and applied to the SET terminals of the channel flip-flops 1REG0–1REG7. The channel flip-flops 1REG0–1REG7 are all associated with input channel IC1. In response to the output signals from receiver REC, the respective channel flip-flops 1REG0–1REG7 which define the data represented by the decoded delayed input signal receiver S1D are SET. In accordance with the assumed 40 millisecond response time of receiver REC, the appropriate channel flip-flops 1REG0–1REG7 are SET 40 milliseconds after delayed input signal S1D was first applied to receiver REC.

As noted previously, input signal S1 ended 100 milliseconds after its initial appearance on channel IC1. As indicated in FIG. 4A, this is 20 milliseconds after initial application of the delayed input signal S1D through AND gate 1RI to receiver REC. When input signal S1 terminates, the inhibiting signal on the control terminal of inhibit gate 1R is removed and the delayed input signal S1D is transmitted through inhibit gate 1R and OR gate 1M and reapplied to the input of delay circuit 1D. This is indicated on FIG. 1A by recirculating input signal sample S1DR which is represented by the medium weight dotted line. The recirculation of input signal sample S1DR through delay circuit 1D will continue until inhibit gate 1R is again closed.

As described above, the appropriate ones of the channel flip-flop 1REG0–1REG7 have been SET so as to define the data represented by input signal S1. When in a SET condition, each of the channel flip-flops 1REG0–1REG7 provide an output signal on its respective output conductor 1R0–1R7. A signal on any of the conductors 1R0–1R7 is transmitted through OR gate 1DR and is applied through OR gate 1PR to the control terminal of inhibit gate 1R and through OR gate 1RD to the control terminal of inhibit gate 1RC. Accordingly, when any of the flip-flops 1REG0–1REG7 become SET, inhibit gate 1R is closed and the recirculating of input signal sample S1DR is ended. Accordingly, in this instance, recirculation lasts only 20 milliseconds as indicated in FIG. 4A. Additionally, when any of the flip-flops 1REG0–1REG7 becomes SET, inhibit gate 1RC is closed and its output signal is cut off.

When the output signal from inhibit gate 1RC ceases, AND gate 1RI is disabled and the delayed input signal S1D is cut off from receiver REC. Accordingly, channel IC1 is connected to receiver REC only for that period of time (40 milliseconds in this instance) required for receiver REC to decode the delayed input signal S1D and register the decoded information on the channel flip-flops 1REG0–1REG7.

When the output signal from inhibit gate 1RC ceases the gating signals are removed from the respective AND gates 1ROC0–1ROC7 thereby disconnecting all of the flip-flops 1REG0–1REG7 from the output conductors D0–D7 of receiver REC. This prevents false registrations in this set of channel flip-flops in response to output signals from receiver REC resulting from the decoding of later input signals received over other input channels IC2 and IC3.

Further, when the output signal from inhibit gate 1RC ceases, the inhibiting signals are removed from the control terminals of inhibit gates 2RC and 3RC. As a result, receiver REC is again made available to input channels IC2 and IC3 in the event that input signals are now present on those input channels. Accordingly, receiver REC immediately is made available to all input channels IC2 and IC3 other than the input channel IC1 over which the last processed input signal S1 was received as soon as information defining the last processed input signal S1 is registered in the appropriate channel flip-flops 1REG0–1REG7.

The output conductors 1R0–1R7 from the channel flip-flops 1REG0–1REG7 are connected by cable 21 to channel register REG1. Channel register REG1 is associated discretely with input channel IC1. The digit steering circuit of register REG1 transmits the information received on the conductors 1R0–1R7 to the first of a plurality of digit registers in register REG1. The steering circuit of register REG1 then prepares to transmit the next information placed on conductors 1R0–1R7 to the second of the digit registers in register REG1 and returns a RESET signal on conductor 1RES when the received information has been registered successfully in the first digit register. Registers REG2 and REG3 respond to information received thereby from the corresponding channel flip-flop sets 2REG0–2REG7 and 3REG0–3REG7 in a similar manner. The registers REG1, REG2 and REG3 each can comprise any of the well known multi-digit registers employed in the communications art. An example of one type of multi-digit register suitable for use in this manner is described in B. McKim et al. Patent 2,564,441 issued Aug. 14, 1951.

The RESET signal transmitted from register REG1 on conductor 1RES of cable 21 is applied to the input terminal of inhibit gate 1IR. If delayed input signal S1D does not end before the processing of delayed signal S1D is completed by receiver REC, inhibit gate 1IR would remain closed. If, however, delayed input signal S1D does not persist beyond the time required to register the information in register REG1, inhibit gate 1IR would now be open. Since the output signals from the flip-flops 1REG0–1REG7 serve to keep inhibit gate 1RC in a closed condition and thus prevent connection of channel IC1 to receiver REC, channel IC1 cannot again be connected to receiver REC through AND gate 1RI until the delayed input signal S1D ceases and permits inhibit gate 1IR to open. This prevents double processing of a single input signal.

Assuming that delayed input signal S1D has ended and inhibit gate 1IR is now open, the RESET signal on conductor 1RES from register 1REG1 is transmitted through inhibit gate 1IR and causes all of the flip-flops 1REG0–1REG7 to be RESET. The output signals are then removed from conductors 1R0–1R7 thereby removing the inhibiting signals from inhibit gates 1R and 1RC. As a result, receiver REC is again made available for response to a subsequent input signal on channel IC1.

FIG. 4B represents an input signal S2 appearing on channel IC1 30 milliseconds after the end of signal S1. This corresponds in time to 10 milliseconds after the successful processing of delayed input signal S1D and the registration of corresponding data in channel register REG1. Since receiver REC is immediately available to channel IC1 when signal S2 first appears on channel IC1, the resulting delayed input signal S2D is immediately applied by the access circuits to receiver REC and processed in the same manner as that described above with reference to the earlier input signal S1.

OVERLAPPING INPUT SIGNALS ON DIFFERENT INPUT CHANNELS (FIGS. 4A AND 4C, 4D AND 4E)

FIGS. 4A and 4C, in combination, represent the condition wherein two overlapping input signals S1 (FIG. 4A) and S2 (FIG. 4C) are received on different input channels IC1 and IC2 and wherein the later of the two input signals S2 persists at least until the earlier of the two signals S1 has been processed by the receiver REC. The earlier input signal S1 received over channel IC1 is processed in exactly the same manner as previously described herein. Signal S2 appears on channel IC2 after the initial appearance of input signal S1 on input channel IC1 but before signal S1 is fully processed by receiver REC. However, signal S2 persists until the processing of the earlier signal S1 is completed by receiver REC.

Signal S2 is transmitted through inhibit gate 2NR and is applied through OR gate 2M to delay circuit 2D and through OR gate 2PR to the control terminal of inhibit gate 2R. Input signal S2 is directly applied to one input terminal of AND gate 2DD.

As shown in FIG. 4C, input signal S2 is delayed for a period of 40 milliseconds by delay circuit 2D and appears as delayed input signal S2D at the output of delay circuit 2D. The delayed input signal S2D is applied to the input terminal of inhibit gate 2R which is now closed due to the application of input signal S2 to its control terminal.

Delayed input signal S2D also is applied to the input terminal of inhibit gate 2RC. Inhibit gate 2RC is closed at this time due to the above described output signal from inhibit gate 1RC presently applied to the control terminal of inhibit gate 2RC. Inhibit gate 2RC remains closed until the output signal from inhibit gate 1RC ceases when the earlier input signal S1 is completely processed by receiver REC and registration is made in the channel flip-flops 1REG0–1REG7.

Delayed input signal S2D also is applied to one input terminal of AND gate 2RI. AND gate 2RI remains disabled until the inhibiting signal is removed from the control terminal of inhibit gate 2RC. Thus, receiver REC remains unavailable to the input signal S2 in its delayed form S2D on channel IC2 until the previous input signal S1 is fully processed and registered on the appropriate channel flip-flops.

Delayed input signal S2D also is directly applied to the control terminal of inhibit gate 2IR for reasons corresponding to those discussed earlier herein with reference to inhibit gate 1IR.

As indicated in FIG. 4A, the earlier input signal S1 is fully processed by receiver REC and appropriate registrations made in the channel flip-flops 1REG0–1REG7 120 milliseconds after the initial appearance of input signal S1 on input channel IC1. Accordingly, at this time, inhibit gate 1RC is closed in response to output signals from the SET flip-flops 1REG0–1REG7 as described earlier herein. When this occurs, the inhibiting output signal from inhibit gate 1RC is removed from the control terminals of inhibit gates 1RNA, 2RC and 3RC. As a result, an output signal is now provided by inhibit gate 2RC in response to the delayed input signal S2D. The output signal from inhibit gate 2RC is applied directly to the other input terminal of AND gate 2RI. Accordingly, channel IC2 is connected through AND gate 2RI to receiver REC as soon as processing of the earlier input signal S1 is completed by receiver REC. The delayed input signal S2D is transmitted through AND gate 2RI and applied to receiver REC.

FIG. 4C indicates that input signal S2 ends 100 milliseconds after its initial appearance on channel IC2, which corresponds in time to 120 milliseconds after the initial appearance of input signal S1 on channel IC1. At this time and as a result of termination of input signal S2, the inhibiting signal is removed from the control terminal of inhibit gate 2R. As a result, recirculation of the last 40 millisecond period of delayed input signal S2D through inhibit gate 2R, OR gate 2M and delay circuit 2D commences and will continue until inhibit gate 2R is again closed. It should be noted, however, that the 40 millisecond recirculating signal S2DR is itself delayed by delay circuit 2D for a period of 40 milliseconds and will not appear as an input to AND gate 2RI until 40 milliseconds after inhibit gate 2R is initially opened.

The delayed input signal S2D persists for 40 milliseconds after the termination of input signal S2, which is a sufficient length of time to permit receiver REC to decode the signal S2D and cause the appropriate channel flip-flops 2REG0–2REG7 to be SET. Accordingly, the delayed input signal S2D is processed in exactly the same manner as that described earlier herein with reference to the delayed input signal S1D. The output signal from inhibit gate 2RC is applied directly to the control terminal of inhibit gate 2RNA; is applied through OR gate RR, inhibit gate 3RNA and OR gate 3RD to the control terminal of inhibit gate 3RC; is applied through OR gate RR, inhibit gate 1RNA and OR gate 1RD to the control terminal of inhibit gate 1RC; and is applied directly to one input terminal of each of the AND gates 2ROC0–2ROC7. As a result, receiver REC is made unavailable to input channels IC1 and IC3 and a connection is established between the output conductors D0–D7 of receiver REC and the channel flip-flops 2REG0–2REG7. When the appropriate channel flip-flops 2REG0–2REG7 are SET, the resulting output signals on conductors 2R0–2R7 cause inhibit gate 2R to be closed thereby cutting off recirculation of signal sample S2DR; and cause inhibit gate 2RC to be closed thereby disabling AND gate 2RI and disconnecting channel IC2 from receiver REC, disconnecting the output conductors D0–D7 of receiver REC from the channel flip-flops 2REG0–2REG7, and permitting the inhibit gates 1RC and 3RC to open and make receiver REC again available for input signals on channels IC1 and IC3.

The output conductors 2R0–2R7 from the channel flip-flops 2REG0–2REG7 are connected through cable 22 to channel register REG2. In a manner similar to that described above with reference to register REG1, channel register REG2 stores the information received over conductors 2R0–2R7 and transmits a RESET signal over conductor 2RES which is applied to the input terminal of inhibit gate 2IR. If delayed input signal S2D has ended, as shown in FIG. 4C, inhibit gate 2IR is open and the RESET signal from channel register REG2 is applied to the RESET terminals of all of the channel flip-flops 2REG0–2REG7 causing them to be RESET. As a result, the output signals are removed from the conductors 2R0–2R7 thereby removing the inhibiting signal from inhibit gate 2RC and inhibit gate 2R. When inhibit gate 2RC is thus opened, receiver REC becomes available for processing the next input signal on channel IC2.

Accordingly, the access circuitry between receiver REC and input channels IC1 and IC2 has successively serviced overlapping input signals S1 and S2 where the later signal S2 persists at least until the earlier signal S1 is processed.

FIGS. 4A and 4D in combination illustrate the condition wherein the later of two overlapping input signals S1 (FIG. 4A) and S2 (FIG. 4D) appearing on different input channels IC1 and IC2 does not persist until the servicing of the earlier input signal S1 is completed by receiver REC. FIG. 4A indicates that processing of the earlier input signal S1 on channel IC1 is completed by receiver REC 120 milliseconds after its initial appearance on input channel IC1 as described earlier herein. FIG. 4D indicates that the later input signal S2 ends 70 milliseconds after the initial appearance of signal S1 on channel IC1. In the manner described above, signal S2 is delayed for a period of 40 milliseconds by delay circuit 2D and appears as delayed input signal S2D on the output of delay circuit 2D 50 milliseconds after the initial appearance of signal S1 on channel IC1. Input signal S2 persists for only 50 milliseconds. Accordingly, the delayed input signal S2D also persists for only 50 milliseconds and ends 110 milliseconds after the initial appearance of signal S1 on channel IC1. Therefore, delayed input signal S2D has terminated before access is provided for it to receiver REC.

As described above, when signal S2 ends inhibit gate 2R is opened and a 40 millisecond sample S2DR of input signal S2 is transmitted through inhibit gate 2R and OR gate 2M and applied to delay circuit 2D. This input signal sample S2RD is continuously recirculated through inhibit gate 2R, OR gate 2M and delay circuit 2D until inhibit gate 2R is again closed by a signal on its control terminal. The recirculating signal sample S2DR first appears at the output of delay circuit 2D 40 milliseconds after the termination of input signal S2, which corresponds in time to the end of delayed input signal S2D. In this way, a time sample S2DR of the original input signal S2 is continuously applied to the input terminal of inhibit gate 2RC and to one input terminal of AND gate 2RI as soon as the delayed input signal S2D terminates.

When, as a result of the registration of information defining input signal S1 in channel flip-flops 1REG0–1REG7, the inhibiting signal is removed from inhibit gate 2RC as described above, the recirculating input signal sample S2DR produces an output signal from inhibit gate 2RC. As described earlier herein, the output signal from inhibit gate 2RC enables AND gate 2RI causing channel IC2 to be connected to receiver REC. The recirculating input signal sample S2DR of the input signal S2 is thus applied through AND gate 2RI to receiver REC. The input signal sample S2DR is decoded by receiver REC and corresponding information registered in the channel flip-flops 2REG0–2REG7 as described earlier. The resulting output signals from the channel flip-flops 2REG0–2REG7 close inhibit gate 2RC thereby disconnecting channel IC2 from receiver REC and also close inhibit gate 2R thereby cutting off the recirculation of the sample S2DR of the original input signal S2.

The registration of information in register REG2, the RESET of channel flip-flops 2REG0–2REG7 and the return to channel IC2 of access to receiver REC is then accomplished in exactly the same manner as described earlier herein.

Accordingly, the access circuitry between input channels IC1 and IC2 and receiver REC has permitted receiver REC to successively service overlapping input signals S1 and S2 on different channels IC1 and IC2 even though the later signal S2 ended before processing of the earlier signal S1 was commenced.

FIGS. 4A and 4E, in combination, illustrate the condition wherein a later input signal S2 (FIG. 4E) on one input channel IC2 ends after processing of an earlier signal S1 (FIG. 4A) on another input channel IC1 commences, but before processing of the earlier signal S1 is completed by receiver REC. FIG. 4E indicates that input signal S2 appears on channel IC2 10 milliseconds after the appearance of signal S1 on channel IC1, and that both signals S1 and S2 end at the same time.

In accordance with the descriptions presented earlier herein, input signal S2 is delayed by delay circuit 2D for a period of 40 milliseconds and appears as delayed input signal S2D on the output of delay circuit 2D 40 milliseconds after the initial appearance of input signal S2 on channel IC2. Delayed input signal S2D persists for 40 milliseconds after the cessation of input signal S2 which includes a time period of only 20 milliseconds after the processing of signal S1 is completed by receiver REC. This 20 millisecond period is not sufficiently long to provoke a proper response by receiver REC.

As described earlier herein, the 40 millisecond sample S2DR of input signal S2 starts to recirculate through delay circuit 2D as soon as input signal S2 no longer appears on input channel IC2. The recirculating signal sample S2DR appears on the output of delay circuit 2D 40 milliseconds after the start of its recirculation. Accordingly, the recirculating sample S2DR of the initial input signal S2 is available on the output of delay circuit 2D at the same time that the delayed input signal S2D ends. Therefore, the recirculated sample S2DR supplements the delayed input signal S2D so as to provide a full 40 milliseconds of continuous signal for application to receiver REC.

The processing of input signal S2 occurs exactly as described above with reference to FIG. 4D with the exception that the 20 millisecond end portion of the delayed input signal S2D and the initial 20 millisecond portion of the recirculated sample S2DR are combined to provide an input signal which is of sufficient time duration to provoke a proper response by receiver REC.

OVERLAPPING INPUT SIGNALS ON THE SAME INPUT CHANNEL (FIGS. 4A AND 4F)

FIGS. 4A and 4F, in combination, illustrate the condition wherein a later signal S2 (FIG. 4F) on channel IC1 is received before an earlier signal S1 (FIG. 4A) on the same channel IC1 is fully processed by receiver REC. FIG. 4F indicates that input signal S2 commences 110 milliseconds after the initial appearance of input signal S1 on channel IC1 and 10 milliseconds after the end of input signal S1. Accordingly, signal S2 is present on channel IC1 before signal S1 is fully processed, i.e., before 120 milliseconds has elapsed since the initial appearance of signal S1 on channel IC1.

As indicated in FIG. 4A and as described earlier herein a 40 millisecond sample S1DR of input signal S1 starts to recirculate through inhibit gate 1R as soon as input signal S1 ends. So long as inhibit gate 1R remains open, the signal sample S1DR is applied to one input terminal of AND gate 1DD. This condition exists until inhibit gate 1R is again closed as a result of the storing of information in the channel flip-flops 1REG0–1REG7 as described earlier herein.

As indicated in FIG. 4F, signal S2 appears on channel IC1 before inhibit gate 1R is closed to cut off the recirculation of the signal sample S1DR. Signal S2 is directly applied to the other input terminal of AND gate 1DD. As a result, an output signal is provided by AND gate 1DD.

The output signal from AND gate 1DD is applied through conductor RES1 to channel register REG1. In response to this signal on conductor RES1, all digit registers in channel register REG1 are initialized, and the digit steering circuit in register REG1 is also initialized so as to connect the first digit register of channel register REG1 to the output conductors 1R0–1R7 from channel flip-flops 1REG0–1REG7.

The output signal from AND gate 1DD is also transmitted to circuit means (not shown) which cause a reorder signal to be applied to input channel IC1. The reorder signal is transmitted back over channel IC1 to the signal source now connected to channel IC1 from which signals S1 and S2 were transmitted. The reorder signal indicates to the signal source that all previously transmitted signals in the current sequence of signals must be regenerated.

Thus, the concurrent appearance of an input signal on a channel before an earlier signal on the same channel is completely processed results in the initializing of the channel register associated with that input channel and the regeneration of the appropriate sequence of signals by the signal source from which the signals were transmitted.

Although the illustrative embodiment of my invention described herein contains only a single signal receiver, an additional signal receiver can be employed on an alternate basis or a standby basis for purposes of operational reliability. The redundancy of receiver equipment is provided to insure continuous service in the event that one of the receivers should become inoperative. When alternate use is made of two receivers, one receiver is permitted to recover after serving a request while the other receiver is immediately available to serve the next request. In this way, the channel flip-flops which register information resulting from the decoding of a first signal can be RESET during the same time period that the next signal is decoded by the other receiver.

It is to be understood that the above described arrangements are illustrative of the application of the principles of my invention. Numerous other arrangements may be devised by those skilled in the art without departing from the spirit and scope of the invention.

What is claimed is:

1. A signal receiving system comprising:
a receiver having a minimum signal response time,
a plurality of input channels,
access means responsive to overlapping signals on two of said channels for applying the earlier signal to said receiver and inhibiting application of the later signal to said receiver,
and means controlled by said access means for storing a timed sample of said later signal at least equal to said minimum signal response time and for applying said stored sample to said receiver after response by said receiver to said earlier signal is completed.

2. A signal receiving system comprising:
a receiver for decoding frequency coded signals applied thereto for at least a predetermined length of time,
a plurality of input channels for transmitting frequency coded signals,
receiver access means responsive to overlapping signals on different ones of said input channels for applying the earlier of said overlapping signals to said receiver and for inhibiting application of the later of said overlapping signals to said receiver,
memory means controlled by said access means for taking and storing a timed sample of said later signal,
and said access means responsive to decoding of said earlier signal by said receiver for applying said stored sample of said later signal to said receiver.

3. A signal receiving system in accordance with claim 2 wherein said memory means comprises a plurality of recirculating delay lines each serially connected in one of said input channels.

4. A signal receiving system in accordance with claim 2 wherein said timed sample is at least equivalent to said predetermined length of time.

5. A signal receiving system in accordance with claim 2 further comprising:
means responsive to decoding of said earlier signal for registering indicia representing said earlier signal,
and said access means including gating means responsive to storage of said indicia by said registering means for inhibiting application of said earlier signal to said receiver and for applying said stored sample of said later signal to said receiver.

6. A signal receiving system in accordance with claim 2 further comprising alarm means responsive to a signal on one of said input channels when a timed sample of a previous signal on said one of said channels remains stored in said memory means for generating an alarm signal.

7. A signal receiving system comprising a signal receiver for decoding frequency coded signals applied thereto for at least a predetermined time interval,
a plurality of input channels on each of which a frequency coded signal may occur,
first gating means for applying the signal on one of said channels to said receiver and for inhibiting application of the signals on all other channels to said receiver,
memory means for taking a timed sample of each of said signals on said other channels which end prior to decoding of said applied input signal by said receiver and for continuously reapplying said signal samples as continuous signals to the respective channels from which each of said signal samples was taken, each of said signal samples being at least equivalent in time duration to said predetermined time interval,
first control means responsive to decoding of said applied signal by said receiver for disabling said first gating means,
second gating means responsive to disablement of said first gating means for applying the signal on one of said other channels to said receiver and for inhibiting application of the signals on the remainder of said other channels to said receiver,
and second control means responsive to decoding by said receiver of said applied signal from said one of said other channels for disabling said second gating means and for cutting off reapplication of said signal sample by said memory means to said one of said other channels.

8. A signal receiving system in accordance with claim 7 wherein said memory means comprises a plurality of recirculating delay line means each connected in series with one of said input channels.

9. A signal receiving system in accordance with claim 7 wherein both said first and second control means comprise buffer register means for storing indicia representing a signal decoded by said receiver.

10. A signal receiving system in accordance with claim 9 wherein said buffer register means include a separate buffer register associated with each of said input channels for storing indicia representing a signal applied to said receiver from the associated input channel.

11. A signal receiving system in accordance with claim 9 further comprising additional register means connected to said buffer register means for registering a plurality of indicia respectively representing a plurality of signals sequentially decoded by said receiver.

12. A signal receiving system in accordance with claim 10 further comprising an additional register means connected to each of said buffer registers for registering a plurality of indicia respectively representing successive signals on said associated channel which are decoded sequentially by said receiver.

13. A signal receiving system in accordance with claim 10 further comprising connecting means responsive to said first gating means for connecting output conductors of said receiver to said separate buffffer register associated with said one of said channels.

14. A signal receiving system in accordance with claim 13 wherein said connecting means is responsive to disablement of said first gating means for disconnecting said receiver from said separate buffer register.

15. A signal receiving system in accordance with claim 7 further comprising alarm means responsive to reapplication of said signal sample to said one of said other channels and to another frequency coded signal on said one of said other channels for generating an alarm signal.

16. A signal receiving system comprising:
a signal receiver for decoding frequency coded input signals which have a time duration of at least a predetermined time interval and for generating output signals which define decoded input signals;
a plurality of input channels on which frequency coded input signals appear at random;
receiver access means associated with each input channel;
each access means including:
signal transmission means connected to said associated input channel,
connecting means connected to said transmission means for applying a signal on said transmission means to said receiver, gating means connected to said transmission means and responsive to a signal on said transmission means for enabling said connecting means and for disabling the gating means of all other access means, said transmission means including memory means responsive to termination of an input signal on said associated input channel for storing a sample of the end portion of said terminated input signal at least equivalent in time duration to said predetermined time interval and for continuously applying said stored input signal sample to said connecting means and to said gating means of said each access means, and control means responsive to output signals from said receiver which define said signal applied to said receiver by said connecting means for inhibiting said memory means and said gating means of said each access means and thereby enabling said gating means of all other access means.

17. A signal receiving system in accordance with claim 16 further comprising:

register means associated with each input channel for registering information defining decoded input signals received over the associated input channel; and wherein said control means comprises buffer means responsive to said output signals for temporarily storing said output signals, means for transferring said stored signals from said buffer means to said associated register means, means responsive to registration of said buffered output signals in said register means for initializing said buffer means, and means responsive to initialization of said buffer means for enabling said memory means and said gating means of said each access means.

18. A signal receiving system in accordance with claim 17 further comprising detecting means associated with each input channel responsive to storage of said input signal sample by said memory means in combination with another input signal on said associated input channel for generating an alarm signal.

19. A signal receiving system in accordance with claim 17 further comprising means responsive to a signal on said transmission means for inhibiting said initialization of said buffer means.

20. A signal receiving system in accordance with claim 16 wherein said memory means comprises a recirculating delay line memory serially connected in said transmission means, the delay period of said delay line memory being at least equivalent to said predetermined time interval.

21. A signal receiving system comprising:

a signal receiver for decoding frequency coded input signals applied thereto for at least a predetermined time interval and for generating output signals which define decoded input signals, a first input channel having a first input signal thereon which persists for at least said predetermined time interval, first connecting means associated with said first input channel and responsive to said first input signal for connecting said first input channel to said receiver and applying said first input signal to said receiver, first register means associated with said first input channel and responsive to said first connecting means for registering the receiver output signals which define said first input signal, a second input channel having a second input signal thereon which persists for at least said predetermined time interval and which ends prior to registration of said output signals by said first register means, second connecting means associated with said second input channel and responsive to said second input signal for connecting said second input channel to said receiver and applying said second input signal to said receiver, said second connecting means including gating means controlled by said first connecting means for disabling said second connecting means so long as said first input channel remains connected to said receiver by said first connecting means, storage means associated with said second input channel and responsive to the end of said second input signal for storing a timed sample of said second input signal at least equivalent to said predetermined time interval and for continuously applying said stored input signal sample to said second connecting means, said first connecting means including other gating means responsive to registration of said output signals by said first register means for disabling said first connecting means and thereby disconnecting said first input channel from said receiver, said gating means of said second connecting means responsive to disablement of said first connecting means and to said stored input signal sample for applying said stored input signal sample to said receiver, and second register means associated with said second input channel and responsive to said second connecting means for registering the receiver output signals which define said timed sample of said second input signal.

References Cited

UNITED STATES PATENTS

| | | |
|---|---|---|
| 3,059,228 | 10/1962 | Beck et al. |
| 3,065,304 | 11/1962 | Dawson. |
| 3,364,466 | 1/1968 | Stine. |

HAROLD I. PITTS, Primary Examiner

U.S. Cl. X.R.

340—151, 150, 171, 167